Figure 1:
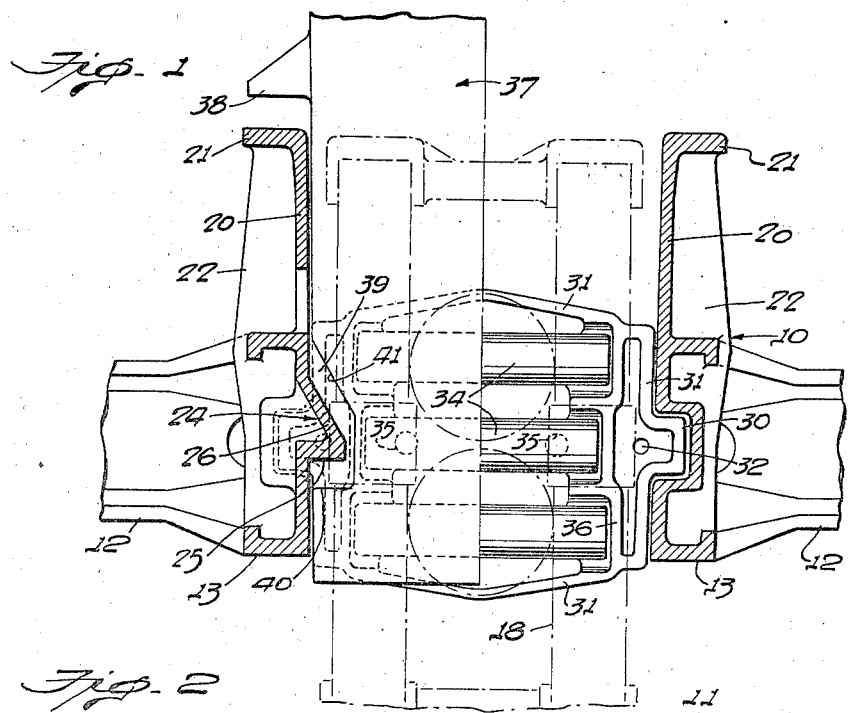

May 10, 1938.　　　　H. T. CASEY　　　　2,116,496

THREE PIECE LATERAL MOTION TRUCK

Filed Oct. 9, 1933　　　2 Sheets-Sheet 1

INVENTOR
Howard T. Casey
BY John Milton Jester
ATTORNEY

May 10, 1938.  H. T. CASEY  2,116,496
THREE PIECE LATERAL MOTION TRUCK
Filed Oct. 9, 1933  2 Sheets-Sheet 2
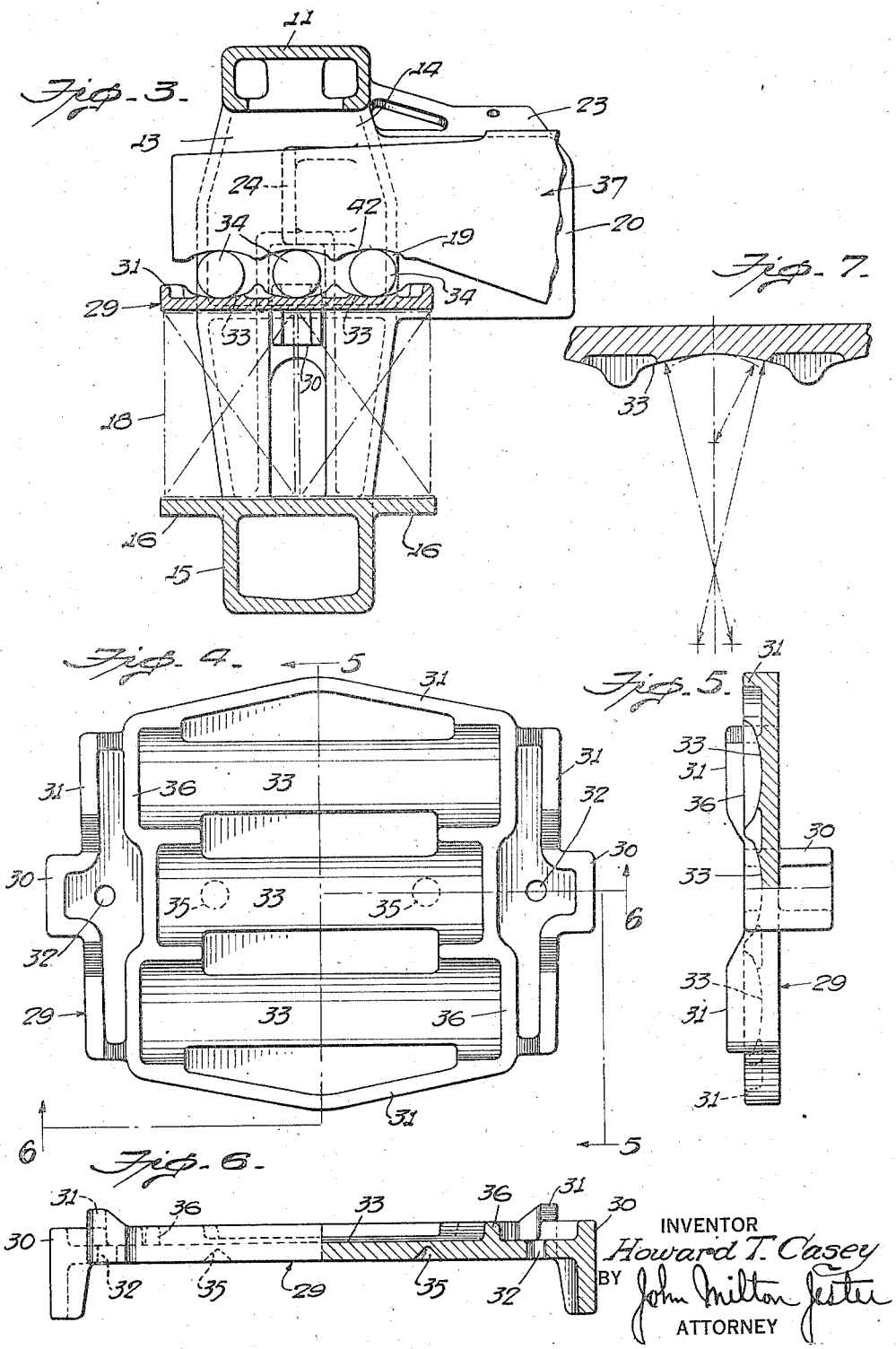
INVENTOR
Howard T. Casey
BY John Milton Jester
ATTORNEY Patented May 10, 1938

2,116,496

UNITED STATES PATENT OFFICE 2,116,496

THREE PIECE LATERAL MOTION TRUCK

Howard T. Casey, Baltimore, Md., assignor, by mesne assignments, to The Symington-Gould Corporation, Rochester, N. Y., a corporation of Maryland Application October 9, 1933, Serial No. 692,846

7 Claims. (Cl. 105—197.2)

The invention relates to railway car trucks, particularly those of the lateral motion type, and has for its general object the provision of a novel truck embodying, aside from specially constructed spring caps, but three parts, the usual spring plank being omitted and the weight and cost of production being consequently decreased.

In some respects the invention may be considered a continuation in part of the disclosure in the pending application of myself, Percy R. Drenning and Sterling F. Ashley for Three-part trucks, filed November 16, 1931 and given Serial No. 575,384, which has now matured into Patent No. 2,036,858, issued April 7th, 1936.

In said patent there is disclosed a truck construction embodying but three parts, namely a pair of side frames and a truck bolster locked thereto, the parts being so constructed and arranged as to eliminate the usual spring plank without, however, sacrificing the necessary or desirable amount of rigidity. Said patent does not, however, contemplate the provision of a truck embodying the characteristics disclosed therein and arranged to permit lateral motion of the truck bolster and it is to provide for this feature that the present construction has been devised.

An important object of the invention is to provide a lateral motion truck based primarily on the fundamental ideas disclosed in said patent but additionally incorporating roller means interposed between the truck bolster and the caps mounted upon the springs provided for supporting the bolster, the roller means operating to permit the truck bolster to have the highly desirable lateral motion for reducing shocks and jars particularly when the truck passes over curved track, cross-overs, on and off from switches or sidings, and the like.

Another object of the invention is to provide a lateral motion truck embodying specially constructed spring caps interconnected with the column guides which define the window openings of the trucks so as to be capable of vertical movement in accordance with spring deflection while restrained against movement in every other direction.

A further object is to provide a lateral motion truck in which there is a species of interengagement or interlocking relation between the column guides and the truck bolster which will enable the latter to have the desired lateral motion while at the same time limiting this motion so that it cannot exceed a certain predetermined safe degree.

Yet another object is to provide a truck bolster in which separation of the side frames with respect to the truck bolster will be entirely prevented when the bolster supporting springs are in place, without it being necessary to employ any auxiliary or adjunctive securing elements cooperating with the bolster and the side frames inasmuch as the side frames and bolster have the interlocking engagement.

A still more specific object is to provide a bolster of this character equipped with peculiarly constructed spring caps socketed to receive and provide bearings for lateral motion rollers, the caps being formed additionally with means having interlocking engagement with the column guides and incapable of disengagement therefrom while the springs are sustaining any weight.

An additional object is to provide a structure of this character which will be simple and inexpensive to make, assemble and install, positive in action, efficient and durable in service, and a general improvement in the art.

Figure 2:
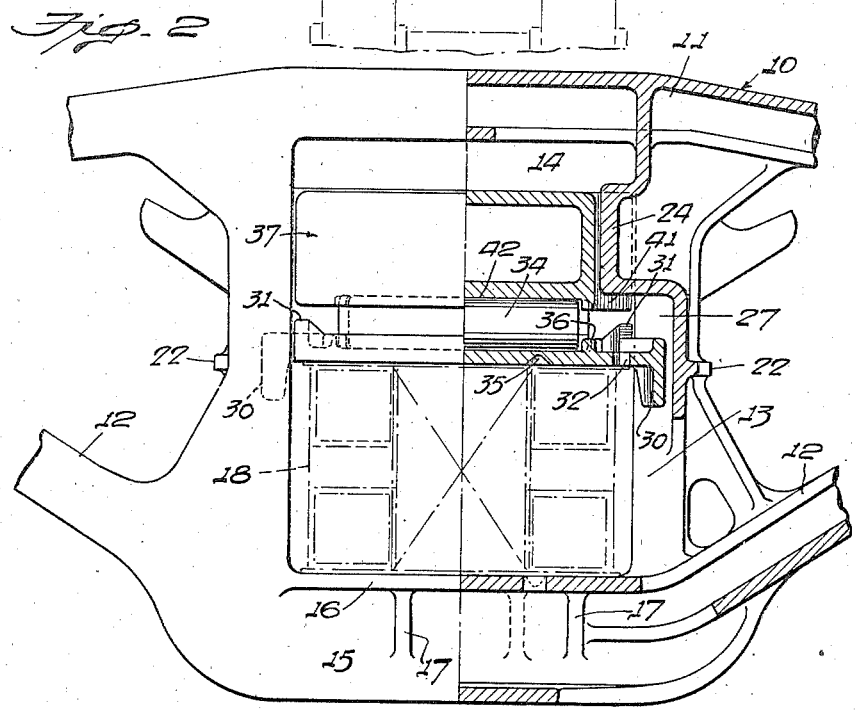

To the attainment of the foregoing and other objects and advantages, the invention preferably consists in the details of construction and the arrangement and combination of parts to be hereinafter more fully described and claimed, and illustrated in the accompanying drawings in which:

Figure 1 is a horizontal section taken through one side of a truck constructed in accordance with my invention, one part of the view being taken along one horizontal plane and the remainder of the view along a lower plane so as to disclose a plan of the spring cap and rollers thereon, Figure 2 is a partial side elevation and partial vertical longitudinal section through the side frame and bolster, Figure 3 is a vertical cross sectional view taken through the side frame longitudinally of the bolster which is shown in elevation, Figure 4 is a plan view of the spring cap without the roller means mounted thereon, Figure 5 is a cross section taken on the line 5—5 of Figure 4, Figure 6 is a section taken on the line 6—6 of Figure 4, Figure 7 is a fragmentary detail sectional view illustrating the shape or curvature of the roller engaging seats.

Referring more particularly to the drawings attention is called in the very first place to the fact that in many respects the side frame is similar to what is disclosed in the above mentioned Patent No. 2,036,858 and that the bolster itself may be formed more or less in accordance with various co-pending applications in so far as internal details and the like are concerned. However, for the sake of clearness, reliance will not be placed upon what is shown in any prior application but the entire construction will be described in complete detail so that the present application will be entirely self-contained or self-supporting.

The truck naturally comprises a pair of side frames, only one of which is shown, indicated as a whole by the numeral 10. Each side frame is represented as including a compression member 11 and a tension member 12 connected by column guides 13 which are spaced apart to define the usual window opening 14. The compression and tension members converge outwardly as is customary and are intended to carry the usual journal boxes which are not shown as they may be of the integral or any other desired type.

The lower ends of the tension members merge into the bottom tie or beam portion 15 which is preferably of closed box-like rectangular form and provided at its top with a spring seat portion 16 projecting laterally beyond the sides of the frame and reinforced as by webs 17. This seat constitutes a support for whatever truck springs are provided for supporting the bolster to be described. These springs are represented only diagrammatically at 18 by dot and dash lines. Any type of spring nest can be used depending upon the preference of the user and may be held against displacement by any appropriate means, the present invention not being concerned with these details. As it is a feature that the usual spring plank is eliminated it follows that the spring nest will engage directly upon the seat 16.

Due to the elimination of the spring plank it is apparent that for squaring the bolster with respect to the side frames reliance must be placed solely upon the cooperative engagement thereof. As a consequence, the column guides 13 are widened outwardly with respect to the sides of the side frame as shown at 19 and are also formed with lateral extensions 20 projecting beyond the inner faces of the side frames and having their confronting faces formed as continuations of or flush with the sides of the window opening so as to define relatively large areas adapted to engage with the bolster to be described. The free ends of these extensions are formed with flanges 21 intended to serve as abutments for cooperation with abutment means on the bolster and to withstand the thrust brace webs or ribs 22 are provided merging into the sides of the frames. Appropriate brake hanger brackets 23 may be provided forming part of these extensions 20. As such brackets may be varied in many respects they are not described in detail.

For cooperation with means on the bolster to be described, the column guides 13 are formed on their confronting faces with projections 24 extending into the window opening and located at the upper portion thereof. These projections are of course integral with the remainder of the side frame and may be of hollow formation as illustrated and preferably so shaped as to provide abutment shoulders 25 and inclined portions 26 leading thereto, the shoulders being disposed toward the outer side of the frame.

Below the projections 24, the column guides are formed with substantially centrally located channels or outwardly offset portions 27 which communicate with the window opening and which extend toward the spring seat 16.

Mounted upon the springs 18 is a roller carrier indicated as a whole by the numeral 29 and shown in detail in Figures 4 to 7. This support is here disclosed as of substantially rectangular form with lateral extensions 30 located centrally of its opposite ends, these extensions being insertable within the channels 27 in order that the support may have vertical movement within the window opening but yet be restrained from movement in any other direction. The marginal portions of the support are preferably beaded or flanged as at 31 for the sake of stiffness and within the confines of these beads there may be provided holes 32 for the escape of any water or other foreign matter which might accumulate at these low points or areas. The member 29 is formed with a plurality of concave portions or bearing seats 33 for the reception of lateral motion rollers 34. As it is not intended that this support or roller carrier 29 be mounted directly upon the truck springs themselves it is represented as having its underside formed with recesses 35 for the reception of the usual tits which project upwardly from the top cap of a spring nest, the idea being that these coacting recesses and tits will prevent the spring nest from lateral displacement with respect to the roller carrier.

The rollers 34, while capable of being formed in different cross sectional shapes are here represented as simply cylindrical. The seats 33 upon which these rollers rest and roll do not extend the full width of the carrier 29 but end at beads or flanges 36 which serve to prevent any longitudinal displacement of the rollers. The seats 33 are of course curved as is customary in connection with the well known Barber lateral motion devices, the curvature being much less abrupt than that of the rollers so that when the rollers move upon these seats under the influence of lateral motion of the bolster to be described a lifting effect will be exerted upon the bolster for the purpose of absorbing the lateral motion producing energy. It is of course conceivable that the seats 33 may have their curvature varied in different ways and Figure 7 illustrates a convenient formation, the radii of the different curves of the different portions of these seats being clearly indicated by the dot and dash lines in said figure, no further explanation being necessary.

The bolster is indicated as a whole by the numeral 37 and may in many respects be more or less similar to those of the ordinary type though it is equally apparent that it may be of a special design particularly as regards its depth at the center, it being clear that owing to the absence of the usual spring plank it is possible for the bolster to have greatly increased depth and consequently greater beam strength so as to resist even unusually severe strains and stresses. The bolster traverses the space between the side frames and has its ends entering the window openings for cooperation with the springs 18. At its opposite sides this bolster is formed with lateral projections 38 constituting abutment shoulders normally spaced from but adapted to engage against the abutment flanges 21 or inner ends of the extensions 20 so as to limit outward movement of the bolster with respect to the side frames. The opposite sides of the bolster are intended to fit fairly closely against the inner faces of the extensions 20 and column guides 13 so as to provide a large bearing surface or area which will insure squaring of the truck or maintaining the bolster at substantially a 90° angle with respect to the side frames. For connecting the bolster in proper cooperative relation to the side frames, I have shown it as formed at its opposite sides with recesses 39 adapted to receive the projections 24 and having square abutment shoulders 40 normally spaced from but adapted to engage the shoulders 25. The other walls 41 of these recesses are inclined to correspond to the inclined portions 26 of the projections 24 from which they are normally spaced but against which they are adapted to engage for limiting lateral motion of the truck bolster with respect to the side frames.

At its underside, each end portion of the bolster is formed with a plurality of curved seats 42 which may be of the same curvature as the seats 33 or of somewhat different form if preferred, this detail being more or less immaterial and following, in general, the usual construction provided in Barber lateral motion trucks. These surfaces 42 coact with the rollers 34 as will at once be apparent from an inspection of the drawings.

In assembling the truck, it will be seen that when the bolster is so positioned that its ends are at the lower portions of the window openings 14, the ends may be passed therethrough owing to the fact that as the projections 24 are located at the upper portions of the window openings they do not obstruct passage of the bolster through the lower portions. The bolster ends having been introduced within the window openings, the bolster is moved upwardly so that the projections 24 will be received within the recesses 39. At this time or under these conditions the shoulders 40 and inclined surfaces 41 of the recesses 39 in the bolster will be spaced from but parallel with the shoulders 25 and inclined surfaces 26, respectively, of the projections 24. Moreover the abutments 38 will be spaced inwardly from the projections 21 at the inner ends of the extensions 20 at the inner faces of the column guides.

The roller carrier 29 is placed within the lower portion of each window opening in such position that the extensions or projections 30 will be opposite the channels 27, the carrier being initially canted or tilted and then being shifted into horizontal position so as to bring the projections into the channels. The rollers are assembled upon the carrier and the assembly is then moved up until the rollers engage the seats 42 on the underside of the bolster. With the bolster and roller carrier assembly in elevated position, the spring nest 18 is inserted within the lower portion of each window opening, whereupon the bolster and roller assembly is let down onto the spring nests. This completes the placing together of the parts in the proper relation.

The truck is used of course in identically the same manner as any other but in contradistinction to what is disclosed in the above mentioned Patent No. 2,036,858 the bolster is capable of lateral motion with respect to the side frames, the tendency to produce which occurs whenever the car rounds a curve, or passes onto or from switches, sidings and the like. The rollers 34 permit the lateral motion and it is apparent that owing to the shape of the roller engaging seats or surfaces whenever lateral motion occurs there is a lifting action on the bolster, the gravitational resistance absorbing the lateral motion producing forces so that there will be a free and easy movement which will eliminate the shocks and jars incident to purely rigid trucks. The advantages of lateral motion trucks are so well known that it is not believed that any elaboration of the subject is necessary. Excessive lateral motion cannot occur owing to the fact that movement of the bolster in one direction is limited by engagement of the surfaces or shoulders 25 and 40 and in the other direction by engagement of the abutments 38 with the flanges 21 as well as engagement of the surfaces 26 and 41.

From the foregoing description and a study of the drawings it will be apparent that I have thus provided a very simply constructed and consequently inexpensive truck having all the advantages of the well known and complicated lateral motion devices but which at the same time consists of only three major parts, namely the bolster and the side frames, it being considered that the rollers and their carriers are merely secondary elements. The details of the construction and operation have already been given and it is consequently believed that everything involved, particularly the advantageous features, will be apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a railway car truck having axles, the combination of side frames having window openings defined between spaced column guides, a bolster extending and constituting the sole connection other than the axles between the side frames and having its ends located within said window openings, coacting means on the column guides and bolster sides located entirely within the confines of the former for connecting the bolster with the side frames and enabling the bolster to have limited lateral motion with respect to the side frames, a spring nest within each window opening, a carrier mounted on each spring nest and formed with curved seats, rollers mounted on said seats and engaging against the underside of the bolster, and means on the confronting faces of the column guides below and independent of said means on the column guides for limiting movement of the carrier to the vertical.

2. In a railway car truck, the combination of side frames having window openings defined between spaced column guides, a bolster extending between the side frames and having its ends located within said window openings, a combination of rectangular and inclined shoulders on the column guides and bolster sides for connecting the bolster with the side frames and enabling the bolster to have limited lateral motion with respect to the side frames, a spring nest within each window opening, a carrier mounted on each spring nest and formed with curved seats, rollers mounted on said seats and engaging against the underside of the bolster, and integral means on the carrier and column guides independent of said shoulders for enabling the carrier to have vertical movement while preventing movement in any other direction.

3. In a railway car truck, a pair of side frames each having a window opening defined between spaced column guides, a bolster extending between the side frames, projections on the column guides extending into each window opening intermediate the edges thereof, said bolster having recesses in its opposite sides receiving said projections, the recesses being of greater length than the projections to enable the bolster to have limited lateral motion with respect to the side frames, spring supported roller means within each window opening beneath said projections engaging against the underside of the bolster, and means other than said recesses and projections for limiting the roller supporting means to vertical movement.

4. In a railway car truck, a pair of side frames each having a window opening defined between spaced column guides, a bolster extending between the side frames, projections on the column guides extending into each window opening, said bolster having recesses in its opposite sides receiving said projections, the recesses being of greater length than the projections and cooperating therewith to enable the bolster to have limited lateral motion in one direction with respect to the side frames, means independent of said projections and recesses for limiting the lateral motion in the other direction, and spring supported roller means within each window opening engaging against the underside of the bolster, said means including a carrier having slidable interfitting engagement with the column guides independently of said projections.

5. In a railway car truck, a pair of side frames each having a window opening defined between spaced column guides, a bolster extending and constituting the sole connection between the side frames, projections on the column guides extending into each window opening, said bolster having recesses in its opposite sides receiving said projections, the recesses being of greater length than the projections to enable the bolster to have limited lateral motion with respect to the side frames, and spring supported roller means within each window opening engaging against the underside of the bolster, said means including a carrier provided at its ends with projections, the column guides having their confronting faces formed with vertically extending channels slidably receiving said projections.

6. In a railway car truck, the combination with a pair of side frames each having a window opening defined between spaced column guides and each having inward extensions flush with the inner faces of the column guides to provide relatively large bearing areas, a bolster extending between the side frames and having its ends located within said window openings, projections on the column guides at the upper portion thereof extending into the window openings, the bolster having its opposite sides formed with recesses corresponding to said projections but of greater dimensions than the same to enable the bolster to have limited lateral motion with respect to the side frames, said recesses defining rectangular and inclined surfaces with respect to the axis of the bolster, abutment means extending laterally from the bolster normally spaced from but engageable with the inner ends of said extensions for limiting the lateral motion in the other direction, a spring nest within each window opening, and a carrier and roller assembly mounted on each spring nest and engaging against the underside of the bolster for supporting the same, and restrained by said last named means against all movement other than vertical.

7. In a railway car truck, the combination with a pair of side frames each having a window opening defined between spaced column guides and each having inward extensions flush with the inner faces of the column guides to provide relatively large bearing areas, a bolster extending between the side frames and having its ends located within said window openings, projections on the column guides intermediate the edges thereof and at the upper portion thereof extending into the window openings, the bolster having its opposite sides formed with recesses corresponding to said projections but of greater dimensions than the same to enable the bolster to have limited lateral motion with respect to the side frames, said recesses providing right angular and inclined shoulders cooperating with said correspondingly shaped projections to limit the lateral motion in one direction, abutment means extending laterally from the bolster normally spaced from but engageable with the inner ends of said extensions for limiting the lateral motion in the other direction, a spring nest within each window opening, a carrier and roller assembly mounted on each spring nest and engaging against the underside of the bolster for supporting the same, and slidably engaged means on the carrier and column guides entirely below said projections for restricting movement of the former to a vertical direction.

HOWARD T. CASEY.